United States Patent Office 3,320,305
Patented May 16, 1967

3,320,305
PROCESS FOR CONVERTING NITRILES
Herbert K. Wiese, Cranford, N.J., assignor to Esso Research and Engineering Company, a corporation of Delaware
No Drawing. Filed Jan. 28, 1964, Ser. No. 340,774
12 Claims. (Cl. 260—486)

The present invention relates to a method of preparing carboxylic acids from nitriles and more particularly to a method of preparing carboxylic acids by reaction of a saturated or unsaturated nitrile in sulfuric acid with a nitrosating agent.

Heretofore it has been proposed to produce carboxylic acids, for example acrylic acid, by heating ethylene cyanohydrin with sulfuric acid and water. The direct hydrolysis of the cyanohydrin with aqueous sulfuric acid by this known method, however, is an extremely hazardous procedure. The reaction is difficult to control and the yields of acrylic acid are inconsistent.

It was then proposed that acrylic acid could be prepared by reacting ethylene cyanohydrin with anhydrous sulfuric acid to produce acrylamide sulfate, adding water thereto, heating the mixture at a temperature sufficient to form acrylic acid and ammonium sulfate, and distilling the acrylic acid therefrom. The reactions involved in the preparation of acrylic acid according to this method of the prior art may be outlined as follows:

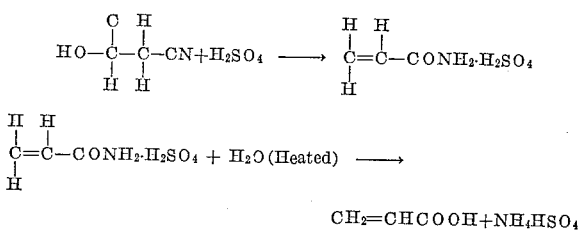

The above reaction of ethylene cyanohydrin with anhydrous sulfuric acid is found to produce quantitative yields of the intermediate acrylamide sulfate. While this intermediate product provides a somewhat satisfactory route to acrylic acid through further hydrolysis and cracking of the hydrolyzed product, such technique is found to have certain inherent disadvantages. For example, one such disadvantage of this method is that undesirable equivalent amounts of ammonium sulfate are produced as a byproduct.

It is an object of this invention, therefore, to provide an improved process for the preparation of carboxylic acids in high yields and to minimize the amount of undesirable byproducts heretofore obtained in the formation of carboxylic acids by the methods of the prior art.

In accordance with the present invention, the above objects are effected by practicing the conversion of saturated nitriles or unsaturated nitriles into saturated or unsaturated carboxylic acids in the presence of sulfuric acid and additionally, in the presence of a nitrosating agent.

Besides accomplishing the foregoing objectives, some other advantages accruing to the present invention are that the carboxylic product may be stripped from strong sulfuric acid solutions used in ester formation, and without neutralizing the acid and that the present invention does not require the use of high purity nitriles as feedstocks.

The sulfuric acid reaction agent primarily used is strong sulfuric acid, that is, sulfuric acid of from 50 to 100%. In the practice of the invention, sulfuric acid of at least 70% strength is preferred. Fuming sulfuric acid, i.e. a solution of sulfuric anhydride in 100% sulfuric acid and alkylated sulfuric acids can also be used as reaction agents. Most satisfactory results are obtained with 70–90% sulfuric acid.

The nitrosating agents found suitable for use in accordance with the method of this invention include those oxides of nitrogen capable of forming nitrosyl sulfuric acid. Non-limiting examples of such oxides include nitrosyl sulfuric acid, $N_2O_3$, NOCl, NOBr, $C_1$ to $C_{12}$ or higher alkyl nitrites, the number of carbons of which being limited by solubility characteristics in the sulfuric acid, nitrous acid, nitrosyl sulfuric anhydride, and the like. Of the foregoing, nitrosyl sulfuric acid is especially preferred.

Broadly, the nitriles suitable for use as starting materials in accordance with this invention include any acid nitrile substantially resistant to side reactions, such as, sulfonation or sulfation. Such materials may be defined as any nitrile having the formula R—C—N wherein R represents an alkyl, alkenyl, cycloalkyl, cycloalkenyl group, a hydroxy substituted saturated hydrocarbon group, or a sulfonation resistant aralkyl or aryl group preferably soluble in the reaction system. While all of such groups suitable contain from 1 to about 12 carbon atoms, the carbon number upper limit of the group is limited only by its solubility in the sulfuric acid employed. Of the groups representing R set forth, the alkyl and alkenyl, especially the alpha-beta substituted alkenyl are preferred.

Non-limiting examples of the nitriles wherein R represents an alkyl group suitable for use in the present invention include acetonitrile, propiononitrile, butyronitrile, valeronitrile, capronitrile, enanthonitrile, caprylonitrile, pelargononitrile, caprinitrile, adiponitrile, succinonitrile, pimelonitrile, and the like. Non-limiting examples of the nitriles wherein R represents an alkenyl group suitable for use in the present invention include acrylonitrile, methacrylonitrile, crotononitrile, anglonitrile, senecionitrile, hydrosorbonitrile, alpha-methylene butyronitrile, and the like. Non-limiting examples of suitable hydroxy nitriles include acetone cyanohydrin, ethylene cyanohydrin, propylene cyanohydrin, and the like. Non-limiting examples of other nitriles suitable for use include cyclobutyronitrile, benzonitrile, beta-phenyl acrylonitrile, cyclohexane acetonitrile, alpha-ethyl cyclohexaneacetonitrile, cyclohexene acetonitrile, and the like.

The nitrile feed may consist of a stream of one of the above nitriles or may consist of a mixture of said above nitriles. It is preferred that the feed comprise a stream having relatively high purity, but one of the advantages of the instant invention is that satisfactory results may be obtained from the use of unpurified feedstocks. For example, a suitable feed may comprise an effluent stream from a propylene or isobutylene ammoxidation unit which contains both saturated and unsaturated nitriles.

In carrying out the process, the nitrile starting reactant and anhydrous sulfuric acid are mixed together, preferably by slowly adding the nitrile to the acid with proper stirring. The temperature of the reaction mixture is maintained within the range of 25 to 250° C. and is maintained preferably within the range of 50 to 150° C. Pressure is not found to be especially critical and may be maintained at atmospheric up to about 75 atmospheres and preferably between 1 and 10 atmospheres. The sulfuric acid may be used in excess of one mole of nitrile to one mole of acid depending on the desired conditions, i.e. fluidity of the product, reaction rate, etc.

The nitrosating agent may be added after the nitrile has been absorbed in the sulfuric acid or it can be added simultaneously with the nitrile. In general, for each mole of nitrile reactant there are used from 0.5 to 5 moles of nitrosating agent. The molar ratio advantageously used is from 0.8 to 1.5 moles, specifically about 1.0 mole if nitrosating agent for each mole of nitrile.

With regard to the reaction rate, it is found that the reaction rate increases with an increase in the molar ratio of acid to nitrile and with an increase in the temperature. It is found that suitable reaction time periods range from about 1 up to 600 minutes and preferably will range from 1 up to 60 minutes. As mentioned, such period is a function of operating conditions, i.e., acid mole ratio, temperature, and the like and the required contact time periods will accordingly vary with the conditions applied.

The chemical compounds formed in accordance with the invention are carboxylic acids corresponding to the nitrile used. By way of explanation, the term "corresponding" as employed herein connotes acids having the same number of carbon atoms, the same general structural configuration, etc. Thus, the structure of the acid product is predictable from the nitrile employed as the starting reactant. In order to illustrate this, the following table sets out the carboxylic acid produced in this way and the nitriles from which they were derived.

| Starting material | Acid product |
|---|---|
| Acetonitrile | Acetic acid. |
| Propiononitrile | Propionic acid. |
| Valeronitrile | Valeric acid. |
| Capronitrile | Caproic acid. |
| Caprylonitrile | Caprylic acid. |
| Acrylonitrile | Acrylic acid. |
| Methacrylonitrile | Methacrylic acid. |
| Crotononitrile | Crotonic acid. |
| Anglonitrile | Angelic acid. |
| Acetone cyanohydrin | Acrylic acid. |
| Propylene cyanohydrin | Crotonic acid. |

In order to recover the product resulting from the process of this invention, the carboxylic acid corresponding in structural identity of the nitrile employed may be recovered from the sulfuric acid as the alkyl, e.g., methyl ester. This is suitably accomplished by adding an alkanol, e.g., methanol to the reaction mixture after the nitrosation is complete and subsequently distilling out the resulting alkyl ester, e.g., methyl ester. The sulfuric acid which remains as residue can, if desired, be recycled back for further use in the process.

The following examples will further illustrate the invention, but the invention is not restricted to these examples.

*Example 1*

A mixture consisting of 79 gm. (0.62 mole) of nitrosyl sulfuric acid ($ONSO_4H$) and 84 gm. of 90% $H_2SO_4$ was added slowly to a flask containing 50 gm. (0.75 mole) of methacrylonitrile and 89 gm. of 55% $H_2SO_4$. The nitrosyl sulfuric acid was added dropwise over a 3-hour period. The temperature of the reaction mixture was kept between 60 to 70° C. by application of a small amount of heat. At the end of the run, 13.1 liters of 0.61 mole of $N_2$ was liberated (theoretical 0.62 mole based on nitrosyl sulfuric acid charged).

The reaction mixture was cooled and 64 gm. of $H_2O$ and 48 gm. of methanol were added and the methyl methacrylate distilled out at atmospheric pressure. Collected 50 gm. of 0.50 mole of methyl methacrylate in the distillate. Based on nitrosyl sulfuric acid added, the yield of methyl methacrylate was 81%.

*Example 2*

A mixture consisting of 50% nitrosyl sulfuric acid and 90% sulfuric is added slowly to a flask containing acrylonitrile dissolved in 75% $H_2SO_4$ (1 mole of nitrosyl sulfuric acid/mole of acrylonitrile). The reaction temperature is maintained at 60–70° C. At the end of the reaction, the reaction mixture is diluted with water and methanol, and the methyl acrylate is distilled overhead in good yield.

*Example 3*

One mole of acetone cyanohydrin is added to 85% $H_2SO_4$ followed by adding 1.1 mole of nitrosyl sulfuric acid dissolved in 90% $H_2SO_4$ at a temperature ranging from 50 to 70° C. As soon as the liberation of $N_2$ gas has ceased, water and methanol are added and the methyl acrylate is distilled overhead in good yield.

*Example 4*

Adiponitrile (0.5 mole) is reacted with 1 mole of nitrosyl sulfuric acid in 90% $H_2SO_4$ at a temperature around 65° C. Dimethyl adipate is recovered from the reaction mixture after adding water and methanol.

*Example 5*

A mixture of 80% acrylonitrile and 20% acetonitrile is dissolved in 80% $H_2SO_4$ and reacted with nitrosyl sulfuric acid (0.9 mole nitrosyl sulfuric acid/mole of nitrile group) at 80° C. After the reaction is over, water and methanol are added and a mixture of methyl acrylate and methyl acetate is obtained by distillation.

*Example 6*

One mole capryl nitrile is dissolved in 90% sulfuric acid and treated with 0.5 mole $N_2O_3$ at 60–70° C. After the liberation of $N_2$ has stopped, water is added and the sulfuric acid neutralized with sodium hydroxide. Caprylic acid is isolated in good yield from the sodium sulfate by extraction with diethyl ether.

*Example 7*

The following example serves to illustrate the effectiveness of the recovery of the acid product of this invention from strong sulfuric acid solution. In the example, methacrylic acid was produced in a manner similar to that of Example 1. The product acid was then contacted with amounts of methanol. The conditions employed and the data resulting therefrom are set forth below.

RECOVERY OF METHACRYLIC ACID FROM STRONG SULFURIC ACID AS THE METHYL ESTER

| $H_2SO_4$ | Methacrylic Acid | MeOH | Methyl Methacrylate Recovered | |
|---|---|---|---|---|
| | | | Moles | Percent |
| 0.49 [1] | 0.488 | 0.5 | 0.445 | 91.2 |
| 0.49 [1] | 0.488 | 1.0 | 0.466 | 95.5 |
| 0.48 [2] | 0.488 | 0.7 | 0.477 | 97.8 |

[1] As 54.5% aq. $H_2SO_4$.
[2] As 72.6% aq. $H_2SO_4$.

The improved method herein described for the production of carboxylic acids possesses many advantages which will be apparent to those skilled in the art. The conversion of nitriles to carboxylic acids corresponding thereto in configuration, number of carbon atoms, etc. and the subsequent direct recovery thereof are smooth, readily controlled reactions. The method is relatively simple and easily effected and the desired acid is obtained in high yields.

While the invention has been described with particular reference to specific embodiments, it is to be understood that it is not to be limited thereto, but it is to be construed broadly and restricted solely by the scope of the appended claims.

What is claimed is:

1. A method for the preparation of carboxylic acids which comprises heating a nitrile having the formula RCN wherein R is selected from the group consisting of alkyl, alkenyl, cycloalkyl, cycloalkenyl, hydroxy substituted saturated hydrocarbon groups, aralkyl and aryl groups with sulfuric acid and a nitrosating agent selected from the group consisting of nitrosyl sulfuric acid, $N_2O_3$, NOCl, NOBr, $C_1$–$C_{12}$ alkyl nitrites, nitrous acid and nitrosyl sulfuric anhydride.

2. The method of claim 1 wherein the sulfuric acid has a strength of from 50 to 100 percent.

3. A method for the preparation of carboxylic acids which includes the steps of admixing a nitrile having the formula RCN wherein R is selected from the group consisting of alkyl, alkenyl, cycloalkyl, cycloalkenyl, hydroxy substituted saturated hydrocarbon groups, aralkyl and aryl groups with sulfuric acid at a temperature within the range of 25–250° C., and at a pressure of from 1 to 75 atmosphere, adding a nitrosating agent selected from the group consisting of nitrosyl sulfuric acid, $N_2O_3$, NOCl, NOBr, $C_1$–$C_{12}$ alkyl nitrites, nitrous acid and nitrosyl sulfuric anhydride thereto, heating the mixture at a temperature and for a reaction period sufficient to produce the carboxylic acid.

4. The method of claim 3 wherein the temperature is maintained within the range of from 50 to 150° C.

5. The method of claim 3 wherein the pressure is maintained within the range of from 1 to 10 atmospheres.

6. The method of claim 3 wherein the reaction period is from 1 to 600 minutes.

7. A method for the preparation of carboxylic acids which includes the steps of admixing a nitrile having the formula RCN wherein R is selected from the group consisting of alkyl, alkenyl, cycloalkyl, cycloalkenyl, hydroxy substituted saturated hydrocarbon groups, aralkyl and aryl groups with sulfuric acid at a temperature within the range of 25–250° C., and at a pressure of from 1 to 75 atmospheres, adding a nitrosating agent selected from the group consisting of nitrosyl sulfuric acid, $N_2O_3$, NOCl, NOBr, $C_1$–$C_{12}$ alkyl nitrites, nitrous acid and nitrosyl sulfuric anhydride thereto, heating the mixture at a temperature and for a reaction period sufficient to produce the carboxylic acid, adding an alkanol to the reaction mixture and distilling out the carboxylic acid in the form of the alkyl ester thereof.

8. The method of claim 7 wherein the sulfuric acid is recycled back to the initial reaction mixture.

9. The method of claim 7 wherein the nitrile is acrylonitrile.

10. The method of claim 7 wherein the nitrile is methacrylonitrile.

11. The method of claim 7 wherein the nitrile is acetone cyanohydrin.

12. The method of claim 7 wherein the nitrosating agent is nitrosyl sulfuric acid.

References Cited by the Examiner
UNITED STATES PATENTS

| | | | |
|---|---|---|---|
| 2,607,081 | 8/1952 | Taylor | 260—486 |
| 2,913,486 | 11/1959 | Veatch | 260—486 |
| 3,067,241 | 12/1962 | Vogt | 260—486 |
| 3,205,039 | 9/1965 | Hüter et al. | 260—526 |

OTHER REFERENCES

Bovey, Chem. Rev., vol. 42, pp. 494–496 (1948).

Wagner, Synthetic Organic Chemistry, pp. 412–415 (1953).

LORRAINE A. WEINBERGER, *Primary Examiner.*

D. P. CLARKE, ALBERT P. HALLUIN,
*Assistant Examiners.*